US006645397B2

(12) United States Patent
Ichihashi

(10) Patent No.: US 6,645,397 B2
(45) Date of Patent: Nov. 11, 2003

(54) LIQUID CRYSTAL COMPOSITION, COLOR FILTER AND OPTICAL FILM

(75) Inventor: Mitsuyoshi Ichihashi, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/874,004

(22) Filed: Jun. 6, 2001

(65) Prior Publication Data

US 2002/0018863 A1 Feb. 14, 2002

(30) Foreign Application Priority Data

Jun. 26, 2000 (JP) ....................................... 2000-191114

(51) Int. Cl.[7] ................................................ C09K 19/34

(52) U.S. Cl. .................... 252/299.61; 428/1.1; 428/1.3; 252/299.3; 349/106

(58) Field of Search .............. 428/1.1, 1.3; 252/299.01, 252/299.6, 299.61, 299.62, 299.63, 299.64, 299.65, 299.66, 299.67, 299.3; 349/96–106

(56) References Cited

FOREIGN PATENT DOCUMENTS

| | | | |
|---|---|---|---|
| EP | 0 928 948 | * 7/1999 | ......... G02F/1/1335 |
| JP | 2000-281628 | * 10/2000 | ........... C07C/69/54 |
| WO | 98/52905 | * 11/1998 | .......... C07C/69/92 |

OTHER PUBLICATIONS

* English Translation Submitted.*

* cited by examiner

*Primary Examiner*—Christopher G. Young
*Assistant Examiner*—Jennifer R. Sadula
(74) *Attorney, Agent, or Firm*—Sughrue Mion, PLLC

(57) ABSTRACT

An objective of the present invention is to provide a liquid crystal composition whose orientation undergoes a large change upon irradiation with light, and which also has a large birefringence Δn. The liquid crystal composition contains an aromatic acetylene compound and a chiral compound that undergoes a structural change upon photoreaction, and has such properties that, upon irradiation with light, its helical pitch undergoes a large change in accordance with the level of the light intensity, and that has a large birefringence Δn. Therefore, the present invention makes it possible to provide a reflection type color filter which utilizes the liquid crystal composition, and which provides a lighter display with high reflectance. Moreover, the present invention also provides an optical film that can be formed as a thinner film using the liquid crystal composition.

18 Claims, 3 Drawing Sheets

LIQUID CRYSTAL COMPOSITION, COLOR FILTER AND OPTICAL FILM

BACKGROUND OF THE INVENTION

1. Field of the Invention

The present invention relates to a liquid crystal composition, a color filter and an optical film using such a liquid crystal composition.

2. Description of the Related Art

In general, a color filter used for a color liquid crystal display, etc., is composed of, red (R), green (G) and blue (B) pixels respectively, and black matrixes that are formed between the pixels so as to improve display contrast. Conventionally, the color filter of this type has been mainly formed by dispersing a pigment into a resin or dyeing a resin with a dye. In the manufacturing method also, such a colored resin liquid is coated onto a glass substrate by spin coating, etc., to form a colored resist layer. This is patterned by photolithography to form a color filter pixel, or a colored pixel is printed directly on a substrate; thus, a color filter is manufactured. However, in the manufacturing method of a color filter using a printing method, there is a drawback in that the pixel resolution is low and it is difficult to produce a high-resolution image pattern. In the manufacturing method using the spin coat method, there is also a drawback in that there is a large amount of material loss. Further, it is generally necessary to carry out mask exposure three times in order to form R, G & B pixels respectively, and as a result the manufacturing process is complex and manufacturing cost is high.

The color filter is required to have properties of high transmittance and high color purity. In a method in which a dye is used, transmittance and purity may be improved by optimizing the type of dye and the color resin. Also, in a method using a pigment, transmittance and purity may be improved by using a fine pigment which is more thoroughly dispersed. However, since all of the conventional color filters are color filters of the light-absorbing type, there is a limit to how much the color purity can be improved by improving the transmittance. In recent years, there have been high demands for transmittance and color purity of color filters used, in liquid crystal display (LCD) panels. In particular, in reflection-type LCD color filters, it is very difficult to simultaneously achieve a degree of whiteness like white paper, contrast and color reproducibility, but there have been particularly high demands for color filters having these properties.

There have been ever-increasing expectations for color filters utilizing the light selective reflection of the cholesteric liquid crystal structure as color filters (hereinafter, sometimes, referred to as "light reflection type color filter") that can solve the above-mentioned problems of the light-absorbing type color filters. In this light reflection type color filter, only light rays having specific wavelengths are reflected by utilizing Bragg reflection derived from circularly polarized light from a cholesteric liquid crystal, and RGB pixels are formed by using this function. Since the spectrum profile of the reflected light has a virtually square shape, it is possible to increase the color purity without causing a reduction in the transmittance. And since there is no light absorption like that of metal, it is possible to obtain a reflection rate of virtually 100% for circularly polarized light. Thus, this type of superior color filter was long awaited.

With respect to the manufacturing method of the reflection type color filter, a liquid crystal composition, which contains a cholesteric liquid crystal formed by coupling chiral units that isomerize upon irradiation with light, is coated by a spin coating method, etc., and light rays having different light intensities are irradiated to carry out patterning in a high-temperature liquid crystal state, and this is quickly cooled off so as to carry out fixing. The cholesteric liquid crystal achieves orientations having different cholesteric pitches in accordance with the light intensities of the rays irradiated for patterning. As a result the distribution of the cholesteric pitches forms pixels having colors of RGB respectively. Moreover, another manufacturing method for the reflection type color filter is one in which a liquid crystal composition, containing materials, such as a polymerizable nematic liquid crystal as a main component, a chiral compound which undergoes a structural change upon irradiation with light, a polymerizable monomer and a polymerization initiator, is subjected to a pattern irradiation in the same manner as the method described above, and is then further subjected to an irradiation of light having a different wavelength so as to be polymerized and thereby form a hard film. In these manufacturing processes, a patterning process for color filters of respective colors of RGB is achieved by carrying out a mask-exposure once. Therefore, as compared with the conventional processes requiring mask exposure to be carried out three times, it is possible to simplify the manufacturing processes. These methods are superior with respect to manufacturing speed, a reduction in the facilities required and material loss among other points. Moreover, optical anisotropic films manufactured by irradiating light onto the liquid crystal composition so as to fix the liquid crystal molecules are not only used as color filters, but also expected to be applied to other optical films such as optical compensation films used for display elements.

However, although the reflection type color filter has superior color purity, there is still some room for improvement of lightness. There is demand for the development of a reflection type color filters that make it possible to provide lighter display. Moreover, the optical film needs to have a certain degree of thickness in order for the liquid crystal molecules to be aligned with a predetermined orientation, and in order to exert a desired optical anisotropy. The optical film having this thickness is not small and thin enough for use as an optical compensation film and the like of a display element. Here, when a liquid crystal composition having a great birefringence $\Delta n$ is utilized, it becomes possible to improve the reflectance of the color filter and also to provide a lighter display. Therefore, this method is advantageous, and also makes thinner optical films for various usages.

SUMMARY OF THE INVENTION

The present invention has been devised to solve the above-mentioned problems of the conventional devices, and its objective is to provide a liquid crystal composition whose orientation changes significantly upon irradiation with light, and also has a large birefringence $\Delta n$. Another objective of the present invention is to provide a reflection type color filter which has a high reflectance and provides a lighter display. Yet another objective of the present invention is to provide an optical film which can be made thinner.

One aspect of the present invention is a liquid crystal composition comprising at least one of compounds represented by the following formula (1) or formula (2) and at least one of chiral compounds whose structure change upon photoreaction:

General formula (1)

$$R^1-(Ar^1)_{n1}-C\equiv C-(Ar^2)_{n2}-L^1-Ar^3-R^2$$

General formula (2)

$$R^3-(Ar^4)_{n3}-L^2-(Ar^5)_{n4}-C\equiv C-Ar^6-R^4$$

wherein, each of $R^1$, $R^2$, $R^3$ and $R^4$ represents at least one monovalent group selected from group 1 which consists of monovalent groups, each of $L^1$ and $L^2$ represents a single bond or at least one divalent group selected from group 2 which consists of divalent groups, each of $Ar^1$, $Ar^3$, $Ar^4$ and $Ar^6$ represents at least one divalent group selected from group 3 which consists of divalent groups, each of $Ar^2$ and $Ar^5$ represents at least one divalent group selected from group 4 which consists of divalent groups, and a carbon ring in groups 3 and 4 which consists of divalent groups may be substituted by at least one of a fluorine atom, a chlorine atom, a bromine atom, $-CF_3$, $-OCF_3$, $-OCHF_2$, $-CH_3$ and $-COCH_3$; each of n1, n2, n3 and n4 represents 0 or 1, and n represents any one of integers from 2 to 15 and groups 1,2,3, and 4 are as follows:

Group 1 of monovalent groups

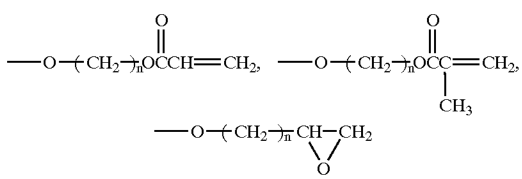

Group 2 of divalent groups $-C\equiv C-$, $-CO-$ (C=O), $-OC-$ (C=O), $-CH=CH-$, $-NHC-$ (C=O), $-CNH-$ (C=O)

Group 3 of divalent groups

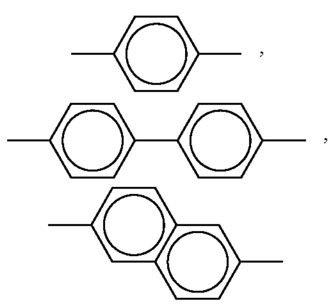

Group 4 of divalent groups

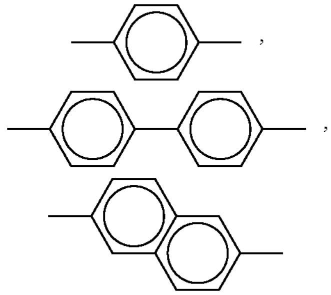

-continued

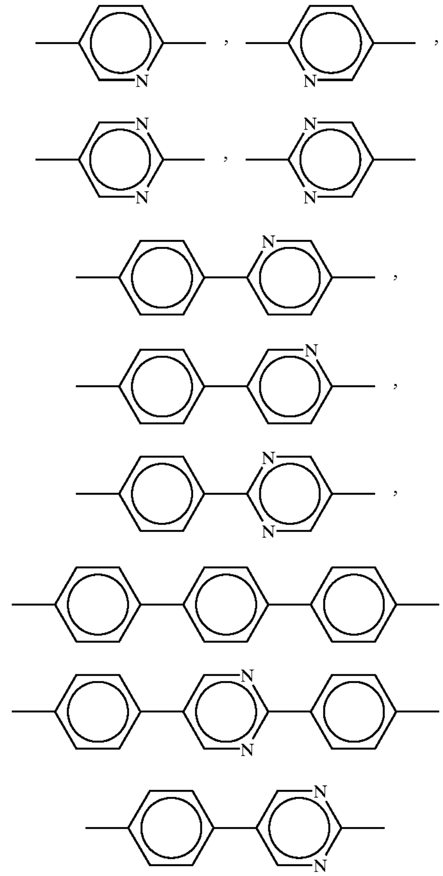

Another aspect of the present invention is a color filter, comprising a layer having colored areas which are formed to have different selective reflections by irradiating active light rays having different irradiation amounts onto the layer having a liquid crystal composition that includes at least one of compounds represented by the formula (1) or formula (2) and at least one of chiral compounds that undergo structural changes upon photoreaction:

Yet another aspect of the present invention is a color filter, comprising a layer having a red area, a green area and a blue area, the respective areas showing colors due to circularly polarized reflections caused by helical pitches with which a compound represented by the formula (1) or formula (2) is oriented and fixed.

A further aspect of the present invention is an optical film, which is formed by irradiating active light rays onto a layer containing a liquid crystal composition that includes at least one of compounds represented by the formula (1) or formula (2) and at least one of chiral compounds that undergo structural changes upon photoreaction to cause a compound represented by the formula (1) or formula (2) to be polymerized and fixed.

DESCRIPTION OF THE PREFERRED EMBODIMENTS

[Liquid Crystal Composition]

Figure 1A:
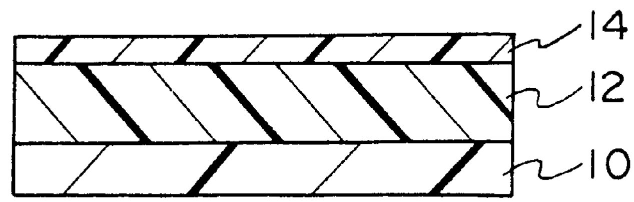
FIGS. 1A to 1D are schematic views that show one portion of processes in which a color filter of the present invention is manufactured.

The liquid crystal composition of the present invention contains at least one of compounds represented by the above-mentioned formula (1) or formula (2) and at least one of chiral compounds whose structure change upon photoreaction. Upon irradiation with light, the helical pitch of the liquid crystal composition of the present invention undergoes a large change in accordance with the level of the light intensity. The liquid crystal composition also has a large birefringence Δn. Consequently, when this composition is used for manufacturing a color filter, it is possible to manufacture a color filter that has a high selective reflectance and provides a lighter display. Moreover, when this composition is used for manufacturing an optical film, it is possible to manufacture an optical film having desired optical properties while maintaining a thin film thickness.

(Compound Represented by Formula (1) or Formula (2))

The compound represented by the formula (1) or formula (2) (hereinafter, sometimes referred to as "liquid crystal compound") is a nematic liquid crystal compound having a polymerizable group. The compound can be oriented with a predetermined helical pitch. For example, the liquid crystal compound is allowed to coexist with a photo-reactive chiral compound in a molten liquid crystal state. This mixture is irradiated with light so that the chiral compound is subjected to a photoreaction to thereby cause a structural change; thus, the liquid crystal compounds is oriented with a predetermined helical pitch.

The following will discuss the formula (1) and formula (2). It is preferable for the compound represented by the formula (1) or formula (2) to have at least one of the groups in the formula in a preferable range. The greater the number of groups within the preferable range, the more preferable the compound. It is most preferable for the compound to have all the groups in the preferable range.

In the formula (1) and formula (2), each of $R^1$, $R^2$, $R^3$ and $R^4$ represents at least one monovalent group selected from the following group 1 consisting of monovalent groups:

Group 1 of monovalent groups

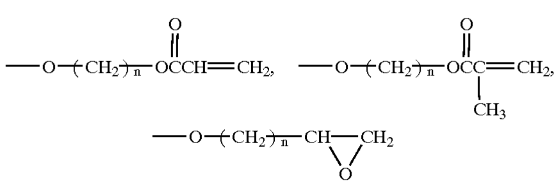

Among those compounds represented by the formula (1) and formula (2), it is preferable that at least one monovalent group selected from group 1 consisting of monovalent groups represented by $R^1$, $R^2$, $R^3$ and $R^4$ respectively, is an acryloyloxy group, since this makes the polymerization rate higher when the liquid crystal composition is fixed.

In group 1, n represents any one of integers from 2 to 15. N is more preferably any one of integers from 3 to 12, and most preferably any one of integers from 4 to 8.

In the formula (1) and formula (2), each of $L^1$ and $L^2$ represents a single bond or at least one divalent group selected from the following group 2 consisting of divalent groups:

Group 2 of divalent groups

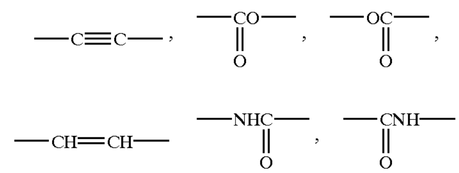

When each of $L^1$ and $L^2$ is a single bond or the following bond:

Δn of the liquid crystal composition tends to become larger. Therefore, this is more preferable since the coating amount is reduced. Here, in the case where $L^1$ is a single bond, $Ar^2$ and $Ar^3$ are directly bonded, and in the case where $L^2$ is a single bond, $Ar^4$ and $Ar^5$ are directly bonded.

In the formula (1) and formula (2), each of $Ar^1$, $Ar^3$, $Ar^4$ and $Ar^6$ represents at least one divalent group selected from the following group 3 consisting of divalent groups. Among these, each of $Ar^1$ and $Ar^4$ is preferably a phenylene group or a biphenylene group, and more preferably a phenylene group. Moreover, among these, each of $Ar^3$ and $Ar^6$ is preferably a phenylene group or a biphenylene group, and more preferably a phenylene group.

Group 3 of divalent groups

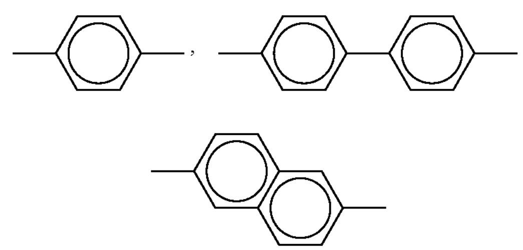

In group 3 of divalent groups, a carbon ring may be substituted, and is preferably substituted by at least one of a fluorine atom, a chlorine atom, a bromine atom, $-CF_3$, $-OCF_3$, $-OCHF_2$, $-CH_3$ and $-COCH_3$. In the case where the carbon ring is substituted by at least one of the substituent groups, solubility in an organic solvent is improved. Therefore, this is preferable since the handling property is improved in the case where the liquid crystal composition of the present invention is used in the form of a coating solution. In particular, the carbon ring of the divalent group represented by each of $Ar^1$ and $Ar^4$ is preferably substituted by at least one of a fluorine atom, a chlorine atom, a bromine atom and $-CH_3$. The carbon ring of the divalent group represented by each of $Ar^3$ and $Ar^6$ is preferably substituted by at least one of a fluorine atom, a chlorine atom, a bromine atom and $-CH_3$.

In the formula (1) and formula (2), each of $Ar^2$ and $Ar^5$ represents at least one divalent group selected from the following group 4 consisting of divalent groups. Among these, each of $Ar^2$ and $Ar^5$ is preferably a phenylene group, a biphenylene group or phenyl pyridine group.

Group 4 of divalent groups

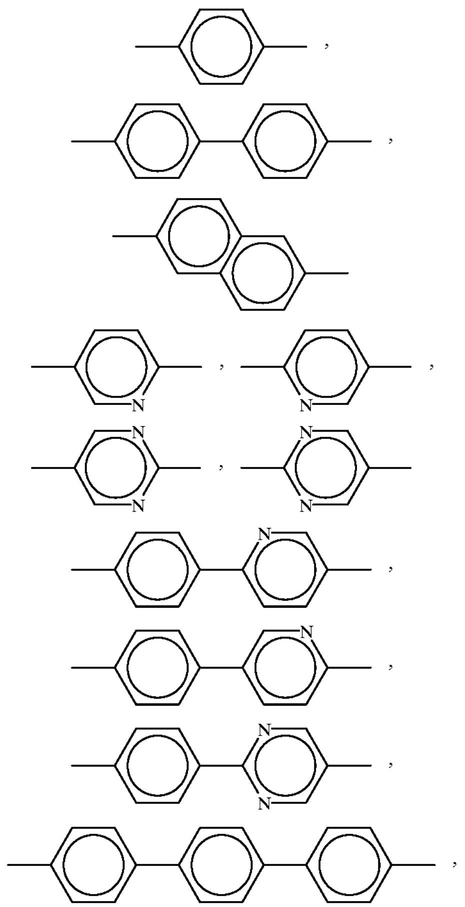

-continued

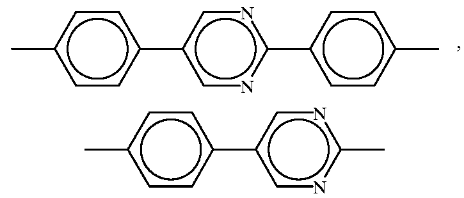

The carbon ring of group 4 of divalent groups may be substituted by at least one of a fluorine atom, a chlorine atom, a bromine atom, —$CF_3$, —$OCHF_2$, —$CH_3$ and —$COCH_3$. In particular, the carbon ring of the divalent group represented by each of $Ar^2$ and $Ar^5$ is preferably substituted by at least one of the above-mentioned substituent groups, and more preferably substituted by at least one selected from a fluorine atom, a chlorine atom, a bromine atom and —$CH_3$.

In the formula (1) and formula (2), each of n1, n2, n3 and n4 represents 0 or 1; and n2 is preferably 0, and n1 is preferably 1. Here, when n1 is 0, $R^1$ and the carbon atom of an ethynyl group are directly bonded. When n2 is 0, the carbon atom of an ethynyl group and $L^1$ are directly bonded. When n3 is 0, $R^3$ and $L^2$ are directly bonded. And when n4 is 0, the carbon atom of an ethynyl group and $L^2$ are directly bonded.

Among compounds represented by formula (1) or (2), those compounds having a birefringence Δn in the range of 0.2 to 0.5 are preferably used, and those compounds having a birefringence Δn in the range of 0.3 to 0.4 are more preferably used.

The following will discuss preferable specific examples (Example Compounds a-1 to a-15) of compounds represented by formula (1) or (2). However, the present invention is not intended to be limited by these specific examples. Here, in the structural formulas of Example Compounds a-1 to a-15, each of n and m represents any one of integers from 2 to 15.

a-1

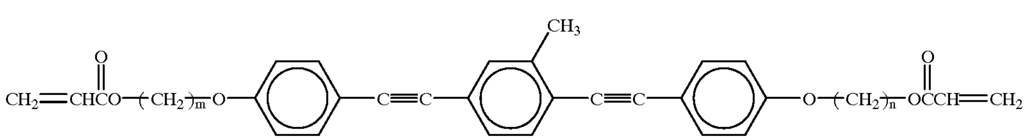

a-2

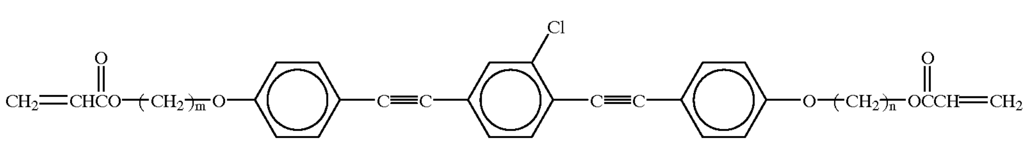

a-3

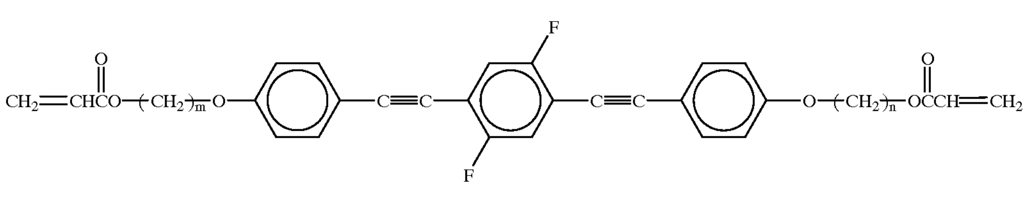

-continued
a-4
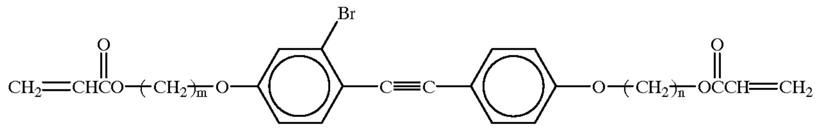
a-5
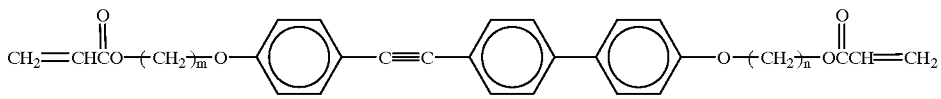
a-6
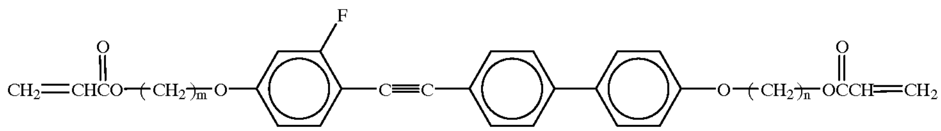
a-7
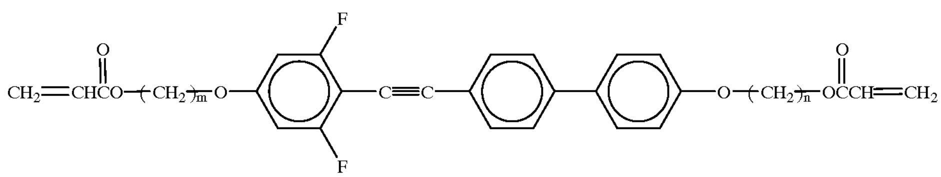
a-8
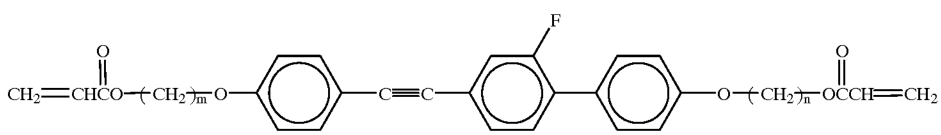
a-9
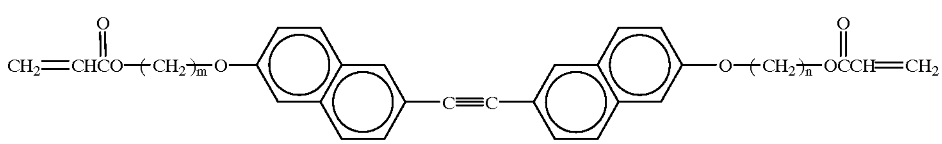
a-10
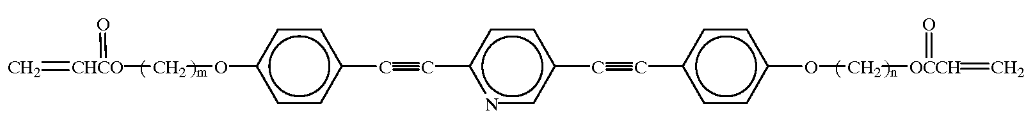
a-11
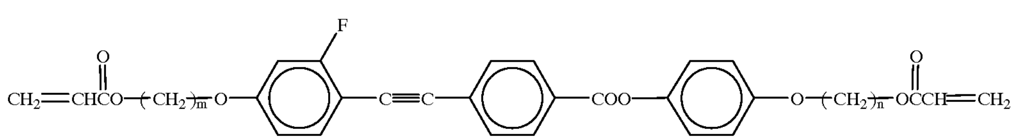

-continued a-12

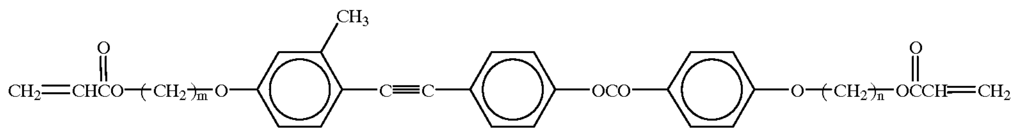

a-13

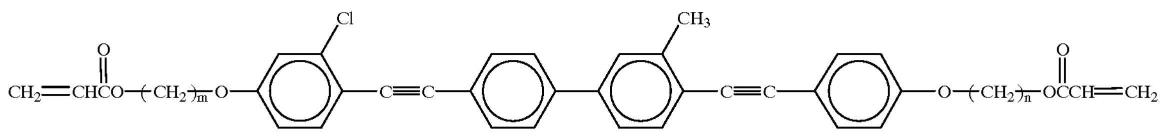

a-14

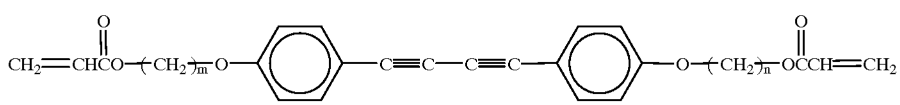

a-15

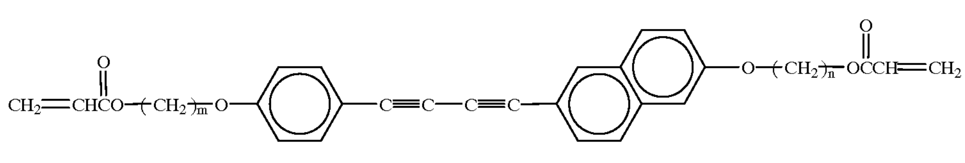

Moreover, compounds represented by the formula (1) or (2) are prepared by a method in conformity with a synthesis method disclosed in, for example, N. Leroux and L. -C. Chien, Liquid Crystals, 21(2), 189(1996) and J. Malthete et al., Mol. Cryst. liq. Cryst., 23, 233 (1973).

(Chiral Compound)

The chiral compound is a compound that undergoes a structural change due to a photoreaction (sometimes, referred to as "photoreactive chiral compound"). The photoreactive chiral compound undergoes a structural change upon irradiation with light (ultraviolet rays—visible rays—infrared rays), and changes an orientation, such as helical pitch, etc., of the liquid crystal compound in accordance with the light intensity of the irradiated light.

In the present invention, in addition to the photoreactive chiral compound, another chiral compound that is not photoreactive, such as a chiral compound whose helix-inducing property is greatly dependent on temperatures, may be used in combination.

The photoreactive chiral compound has a chiral site and a site that undergoes a structural change upon irradiation with light. These sites are not necessarily contained in one molecule, and an aspect that obtains the functions of the photoreactive compound by using two or more kinds of compounds together is also included in the present invention. However, the photoreactive chiral compound is preferably a compound having the sites contained in one molecule. With respect to the photoreactive chiral compound, those which have a strong ability to induce the helical structure of the liquid crystal compound are preferably used. For this reason, a molecule, which has the chiral portion in the center of the molecule and whose periphery has a rigid structure, is preferably used. Its molecular weight is also preferably not less than 300. Further, in order to increase ability to induce the helical structure in the liquid crystal composition, it is preferable that a chiral compound in which the chiral site and the site which causes a structural change by light irradiation are in close proximity is used, since in a compound having this structure, a large degree of structural change is caused by light irradiation. Also a chiral compound which has a high solubility in the liquid crystal compound is preferably used. This compound preferably has a SP value (a parameter of solubility) which is close to that of the liquid crystal compound.

The photoreactive chiral compound is preferably polymerizable. When the photoreactive chiral compound is polymerizable, it is possible to improve the heat resistance of a film containing the liquid crystal composition formed therein (for example, RGB layer of a color filter). Examples of the photoreactive chiral compounds, which are polymerizable, include compounds that have one or more polymerizable group such as an acryloyloxy group, a methacryloyloxy group or an epoxy group.

Examples of the structure of the photoreactive site that is subjected to a structural change upon irradiation with light include those described in "Photochromic Compound" (written by Kingo Uchida and Masahiro Irie, published by Chemical Industry, vol. 64, p. 640, 1999, written by Kingo Uchida and Masahiro Irie, published by Fine Chemical, vol. 28(9), p. 15, 1999), etc.

The following will discuss specific examples (Example Compounds b-1 to b-9) of the photoreactive chiral compounds. However, the present invention is not intended to be limited by these specific examples. Here, with respect to structural formulas in the following Example Compounds b-1 to b-9, n represents any one of integers from 1 to 12.

b-1
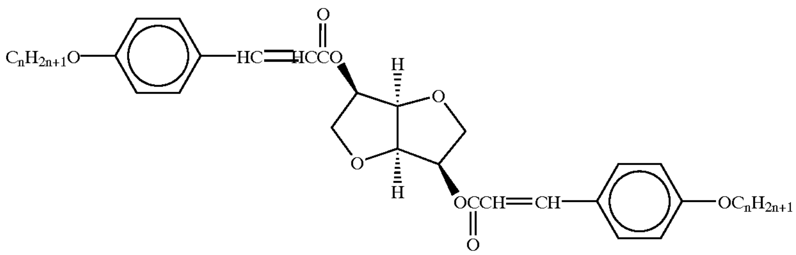
b-2
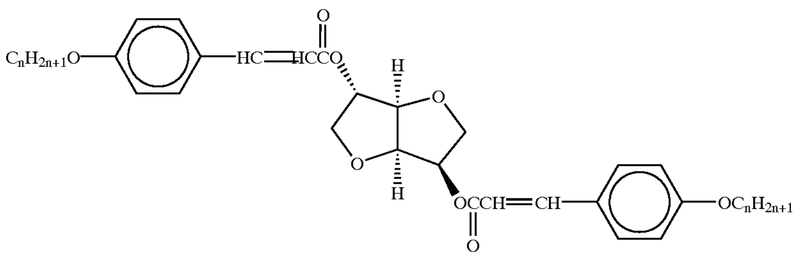
b-3
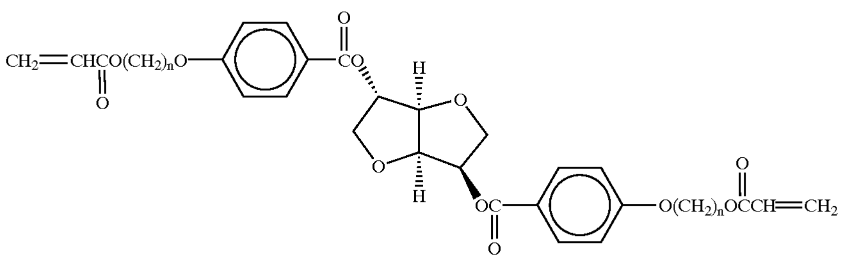
b-4
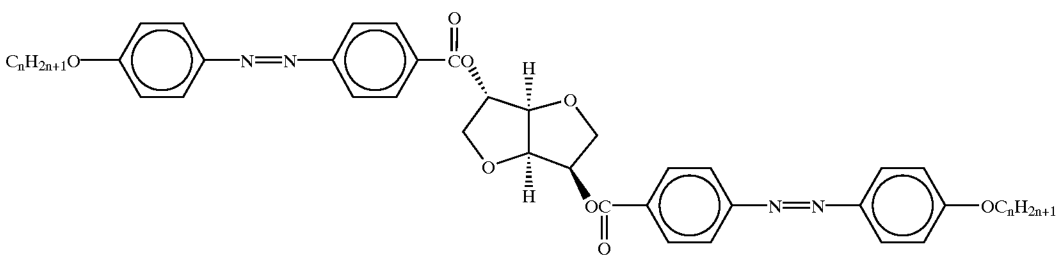
b-5
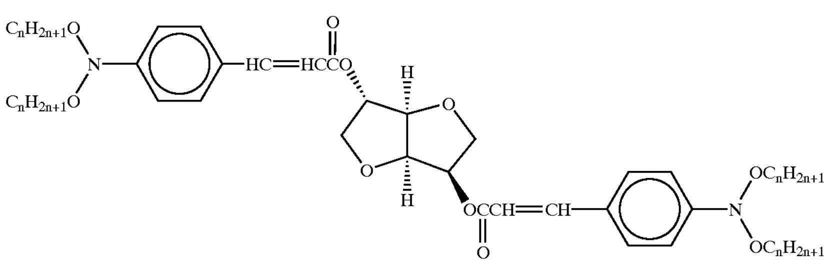
b-6
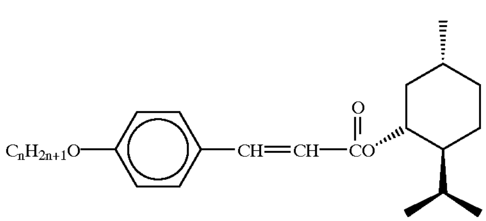

-continued b-7

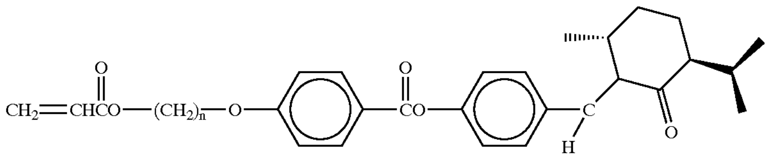

b-8

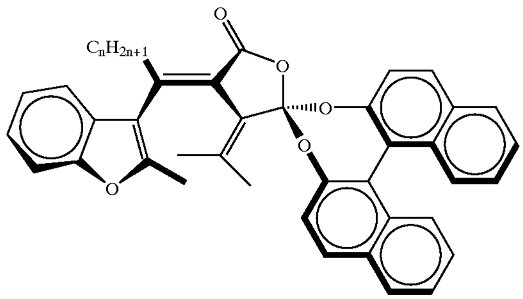

b-9

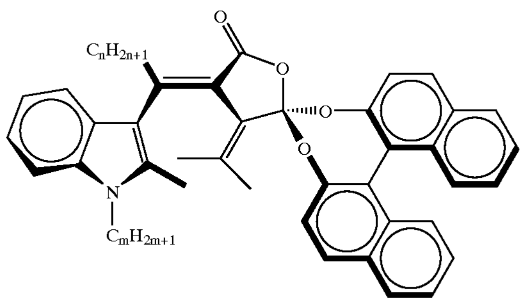

In the liquid crystal composition of the present invention, the content of the compound represented by the formula (1) or (2) is preferably in the range of 10 to 98% by mass, and more preferably, 20 to 80% by mass. Moreover, the content of the photoreactive chiral compound is preferably in the range of 2 to 30% by mass, and more preferably, 3 to 15% by mass.

In the case where two of more kinds of compounds are used in combination as the liquid crystal compound, and in the case where two or more kinds of compounds are used in combination as the photoreactive chiral compound, the total content is preferably in the above-mentioned range.

The liquid crystal composition of the present invention preferably contains a polymerization initiator. This polymerization initiator generates radicals upon irradiation with light, and accelerates the polymerization reaction of the polymerizable group of the liquid crystal composition and the polymerization of the photoreactive chiral compound in the case where the compound is a polymerizable compound. As a result, the liquid crystal compound is securely fixed with a helical pitch having a predetermined selective reflection, and the film strength of a layer composed of the liquid crystal composition is also improved.

With respect to the polymerization initiator, selection may be suitably made from those known materials. Examples thereof include: p-methoxyphenyl-2,4-bis(trichloromethyl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyldimethylketal, thioxanthone/amine, etc.

The content of the polymerization initiator in the liquid crystal composition is preferably in the range of 0.1 to 20% by mass, more preferably, 0.5 to 5% by mass. When the content is in this range, it is possible to improve the curing efficiency at the time of light irradiation, and also to reduce degradation in the light transmittance from the ultraviolet area to the visible light area.

The liquid crystal composition of the present invention may contain other components, if necessary. The other components may be a binder resin or a polymerization inhibitor.

With respect to the binder resin, examples thereof include: polystyrene compounds such as polystyrene and poly-α-methylstyrene, cellulose resins such as methylcellulose, ethylcellulose and acetylcellulose, acidic cellulose derivatives having a carboxylic group in its side chain, acetal resins such as polyvinylformal and polyvinylbutyral, as well as methacrylic acid copolymer, acrylic acid copolymer, itaconic acid copolymer, crotonic acid copolymer, maleic acid copolymer and partially esterificated maleic acid copolymer, which are disclosed in patent publications, such as Japanese Patent Application Laid-Open (JP-A) No. 59-44615, JP-B No. 54-34327, Japanese Patent Application Publication (JP-B) No. 58-12577, JP-B No. 54-25957, JP-A No. 59-53836 and JP-A No. 59-71048.

Moreover, with respect to the above-mentioned binder resin, examples also include homopolymers of acrylic alkylesters and homopolymers of methacrylic alkylesters. These examples include ones wherein the alkyl group is methyl group, ethyl group, n-propyl group, n-butyl group, iso-butyl group, n-hexyl group, cyclohexyl group, or 2-ethylhexyl group. Besides these, examples further include polymers having a hydroxyl group to which an acid anhydride is added, and multi-copolymers, such as benzyl(metha)

acrylate/(homopolymer of methacrylate) acrylic acid copolymers and benzyl(metha)acrylate/(metha)acrylate/another monomer.

The content of the binder resin in the liquid crystal composition of the present invention is preferably in the range of 0 to 50% by mass and more preferably, 0 to 30% by mass. The content exceeding 50% by mass tends to cause insufficient orientation in the liquid crystal compound.

The above-mentioned polymerization inhibitor is added to the liquid crystal composition so as to improve the shelf life. Examples of the polymerization inhibitor include hydroquinone, hydroquinone monomethylether, phenetiazine, benzoquinone and derivatives of these. Each of these is preferably added to the liquid crystal compound in the range of 0 to 10% by mass and more preferably, 0 to 5% by mass.

The liquid crystal composition of the present invention may be used as a coating solution in a solution state in which it is dissolved in a predetermined solvent, or in a molten state. The coating solution is coated onto a substrate, and the coated film thus formed is irradiated with light so that a color filter or an optical film having desired optical properties is manufactured.

Next, a description will be given of a color filter and an optical film utilizing the liquid crystal composition of the present invention.

[Color Filter]

The color filter of the present invention is formed by irradiating active light rays having a different amount of irradiation from each other, onto a layer containing the liquid crystal composition of the present invention so that colored areas are formed which have different selective reflections from each other. After the colored areas have been formed by light irradiation, the liquid crystal composition is again irradiated with light so that the liquid crystal compound having a predetermined orientation is polymerized so as to fix the liquid crystal compound.

In the color filter of the present invention, the respective layers of RGB show colors by circularly polarized light reflections caused by a helical pitch of the liquid crystal compound represented by the formula (1) or (2). The liquid crystal compound represented by the formula (1) or (2) has a large birefringence $\Delta n$ so that it is possible to improve the reflectance of the reflection spectrum of each of the RGB layers caused by the helical pitch. As a result, the application of the color filter of the present invention makes it possible to improve the lightness of the display.

The half-value width of the reflection spectrum of each of the RGB layers of the color filer of the present invention is preferably wide since the wider the half value width, the lighter the display; however, in contrast, an excessively wide half-value width causes a reduction in the color purity. Therefore, in general, the half-value width of the reflection spectrum of each layer is preferably from not less than 50 nm to not more than 150 nm. In particular, the half-value width of the reflection spectrum of the G layer is preferably from not less than 70 nm to not more than 130 nm and more preferably, from not less than 80 nm to not more than 110 nm.

The color filter of the present invention may have a sheet shape comprising only the layer of the liquid crystal composition of the present invention, or may be provided as an aspect in which a layer containing the liquid crystal composition is placed on a desired support, or may be placed together with another layer (film) such as an alignment film and a protective film. Moreover, the layer containing the liquid crystal composition may be a laminate of two or more layers.

The color filter of the present invention is provided with colored areas (in general, RGB pixel areas) having different selective reflections formed by a process (hereinafter, sometimes, referred to as "exposure process") in which active light rays having different irradiation amounts are irradiated onto the layer containing the liquid crystal composition of the present invention. In the exposure process, by irradiating light using a mask corresponding to a desired image pattern, it is possible to form pixels having a desired pattern.

In the exposure process, it is preferable to use a wavelength ($\lambda_1$) to which the photoreactive chiral compound is highly sensitive so as to carry out exposure and patterning image-wise. Upon irradiation of the layer containing the liquid crystal composition with light, the photoreactive chiral compound is subjected to a reaction in accordance with the illuminance of the light, with the result that the helical structure of the liquid crystal compound is changed so that the irradiated areas are allowed to exhibit different selective reflection colors due to the structural change; thus, the pattern corresponding to the images is formed. Therefore, by irradiating light with a different irradiation intensity to each of the desired areas, areas that exhibit different colors in accordance with the irradiation intensities are formed. For example, the exposure is carried out image-wise through an exposing mask having different light transmittances so that the images, that is, colored areas having different selective reflections, are simultaneously formed by carrying out light irradiation only once.

After the exposure process, light having a wavelength ($\lambda_2$) that allows the liquid crystal compound to polymerize (in the case where the liquid crystal composition contains a polymerization initiator, light that allows the polymerization initiator to generate free radicals, etc.) is preferably irradiated so as to cure (fix) the liquid crystal compound (hereinafter, this process is sometimes referred to as "curing process"). This curing process makes it possible to improve the strength and durability of the color filter.

With respect to the wavelength $\lambda_1$, it is preferably a wavelength close to the photosensitive wavelength area of the photoreactive chiral compound, in particular, close to the photosensitive peak wavelength thereof; thus, it is possible to obtain a sufficient patterning sensitivity. Moreover, with respect to the wavelength $\lambda_2$, it is preferably a wavelength close to the photosensitive wavelength area of the polymerization initiator, in particular, to the photo-sensitive peak wavelength thereof; thus, it is possible to obtain a sufficient photopolymerization sensitivity. Moreover, the illuminance (irradiation intensity) of light irradiation in the exposure process and the curing process is not particularly limited. This is appropriately selected in accordance with a material to be used so as to obtain sufficient photosensitivity at the time of patterning and at the time of the polymerization and curing processes.

With respect to the light source used in the exposure and curing processes, a light source emitting ultraviolet rays is preferably used because it has high energy and because structural change and polymerization reaction of the liquid crystal compound is speedy; therefore, for example, a high-pressure mercury lamp, a metal halide lamp, a Hg—Xe lamp, etc. are used. Moreover, in order to irradiate light rays having different irradiation amounts, the light source is preferably provided with a light-quantity varying function. Here, with respect to the wavelength $\lambda_1$ and the wavelength $\lambda_2$, light having the same wavelength ($\lambda_1=\lambda_2$) (single light source) may be used from the viewpoint of making the irradiation light wavelength and the illuminance uniform as well as in view of simplification of the device structure. In the case where $\lambda_1=\lambda_2$, in the exposure process, light irradiation is preferably carried out by using illuminance (irradiation intensity) that does not allow the liquid crystal compound to start a polymerization process, and in the curing process, light irradiation is preferably carried out by using illuminance that can maintain an increase in the half-value width of the selective reflection wavelength band of each of the patterned images at not more than 10%. Normally, the exposure process is carried out in the presence of oxygen, with the result that the polymerization reaction rate tends to be lowered due to radical quenching caused by oxygen, resulting in a reduction in sharpness and color deviation; however, the quick curing process makes it possible to avoid the effects of oxygen, and to provide a color filter having a selective reflection color without color deviation.

Here, the illuminance that does not allow the liquid crystal compound to start a polymerization process refers to an irradiation intensity at which it is possible to prevent the polymerization reaction from partially proceeding at the time of patterning. Moreover, the illuminance that can maintain an increase in the half-value width of the selective reflection wavelength band of each of the patterned images at 10% or less refers to an irradiation intensity which can carry out fixing while maintaining a deviation (color deviation; a deviation of the selective reflection wavelength band obtained by the light irradiation in the exposure process from a half-value width) from a predetermined selective reflection wavelength (desired hue) at 10% or less. In other words, in the above-mentioned exposure process, upon irradiation of the liquid crystal composition with light, an image pattern that exhibits selective reflection colors corresponding to the images is formed. Further, in the curing process, light is irradiated to the liquid crystal composition so as to cause the polymerization reaction to occur quickly so that the curing (fixing) process starts before the chiral compound has responded to the light irradiation, and has caused the helical structure of the liquid crystal compound to change.

Here, the case in which $\lambda_1=\lambda_2$ refers to the case where the spectrum profiles of light rays are virtually identical. This case does not necessarily indicate that the both of the spectrum profiles are completely coincident with each other. It only shows that they have virtually identical main wavelength areas. In the case where $\lambda_1=\lambda_2$, the light illuminance in the exposure process is preferably not more than 100 $mW\cdot cm^{-2}$, and when the light sensitivity of the chiral compound is taken into consideration, it is preferably not less than 2 $mW\cdot cm^{-2}$. Moreover, the light illuminance in the curing process is preferably not less than 150 $mW\cdot cm^{-2}$, and when the light sensitivity of the photoreactive chiral compound is taken into consideration, it is preferably in the range of 200 to 500 $mW\cdot cm^{-2}$.

The manufacturing method of the color filter of the present invention is not particularly limited as long as it includes at least the above-mentioned exposure process. This may be combined with any other appropriate process to provide the color filter. For example, the exposure process may be repeated several times. Moreover, after the exposure process, the curing process may be carried out to manufacture the color filter. Beside these, in accordance with specific manufacturing aspects which may be selected, a process for forming a liquid crystal layer by placing the liquid crystal composition on a substrate, a process for carrying out an alignment process on the surface of contact with the liquid crystal composition, a process for transferring the liquid crystal composition (liquid crystal layer) by adhering and peeling operations, and other processes may be included.

The color filter of the present invention is manufactured by, for example, the following first and second manufacturing methods.

[First Manufacturing Method]

(1) A process in which at least the above-mentioned liquid crystal composition in an coating solution is coated on to a temporary support to form a transfer material containing a liquid crystal layer.

A cushion layer containing a thermoplastic resin, etc., may be placed between the cholesteric liquid crystal layer and the temporary support from the viewpoint of maintaining the adhering property at the time of the transferring process in the case where, foreign matters, etc. are located on an alignment film or the transfer-image receiving material. An alignment process (process for alignment treatment) such as a rubbing process is preferably applied to the surface of the cushion layer, etc.

(2) A process for laminating the transfer material on a light transmitting substrate. In addition to the light transmitting substrate, an image-receiving material having an image-receiving layer on the substrate may be used.

Moreover, the liquid crystal composition may be coated on the substrate without using the transfer material to form a liquid crystal layer (coating process). The coating method may be appropriately selected from known coating methods. However, from the viewpoint of a reduction in the material loss and costs, the transfer method is preferably used.

(3) A process for forming a liquid crystal layer on the substrate by peeling the transfer material from the light transmitting substrate (transfer process).

After the following process (4), the liquid crystal layer may be further laminated so as to be comprised of a plurality of layers.

(4) Ultraviolet rays having a wavelength $\lambda_1$ are irradiated image-wise onto the liquid crystal layer through an exposing mask to form a pixel pattern which displays selective reflection colors, and to this ultraviolet rays having a wavelength $\lambda_2$ are irradiated to cure the layer so as to form a full color filter (exposure process).

[Second Manufacturing Method]

(1) A process for forming a liquid crystal layer by directly coating an coating solution containing the liquid crystal composition onto a support which is a part of a color filter.

Here, the liquid crystal layer may be formed by coating the liquid crystal composition prepared as the coating solution by a known coating method such as a spin coating method.

In the same manner as described above, an alignment film may be formed between the liquid crystal layer and the support. It is preferable to carry out an alignment process (process for alignment treatment) such as a rubbing process on the surface of the alignment film, etc.

(2) The same exposure process as process (4) of the first manufacturing method

The thickness of the liquid crystal layer (sheet shape liquid crystal composition) functioning as the color filter is preferably 1.5 to 4 $\mu$m.

Referring to FIGS. 1A to 3C, the following will discuss one example of a method for manufacturing the color filter of the present invention. FIGS. 1A to 3C are schematic drawings that show one portion of processes for manufacturing the color filter of the present invention.

First, the liquid crystal composition of the present invention is dissolved in an appropriate solvent to prepare a liquid crystal composition as a coating solution. Here, examples of the above-mentioned solvent are 2-butane, cyclohexane, chloroform, tetrahydrofran, etc.

Figure 1B:
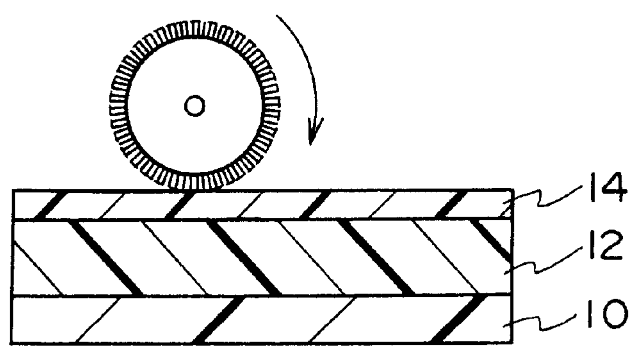

As illustrated in FIG. 1A, a support 10 (hereinafter, also referred to as "temporary support") is prepared, and a cushion layer 12 (thermoplastic resin layer) is formed on the support 10 by coating it with a material such as an acrylic resin, a polyester resin or vinylchloride, and further on this an alignment film 14 composed of polyvinyl alcohol, etc is laminated. This alignment film is formed by a rubbing treatment as illustrated in FIG. 1B. This rubbing treatment is not necessarily required; however, the rubbing treatment provides a better orientation.

Figure 1C:
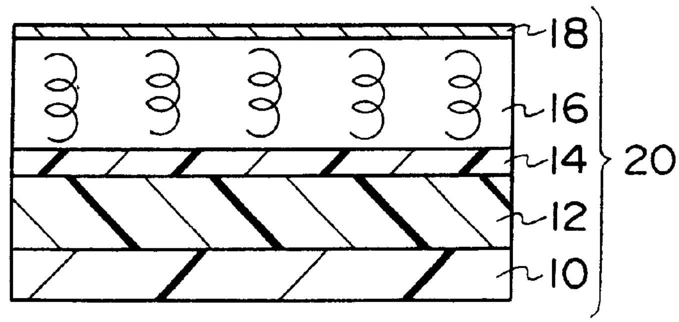

Next, as illustrated in FIG. 1C, the liquid crystal composition in the form of the coating solution is coated to the alignment film 14, and dried thereon to form a liquid crystal layer 16. This liquid crystal layer 16 is then coated with a cover film 18 to form a transfer material. Hereinafter, this transfer material is referred to as a transfer sheet 20.

Figure 1D:
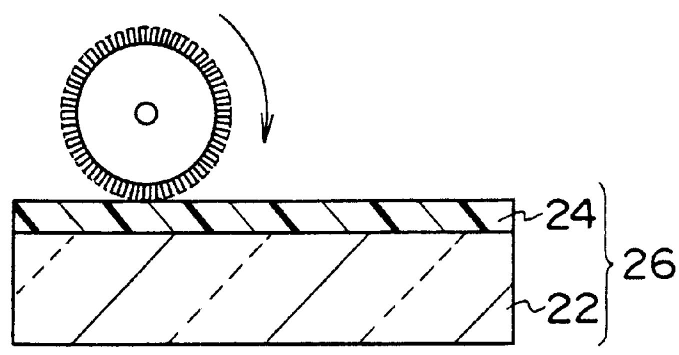

As illustrated in FIG. 1D, another support 22 is prepared, and an alignment film 24 is formed on the support in the same manner as described above, and a rubbing treatment is applied to the surface thereof. Hereinafter, this is referred to as a color filter substrate 26.

Figure 2A:
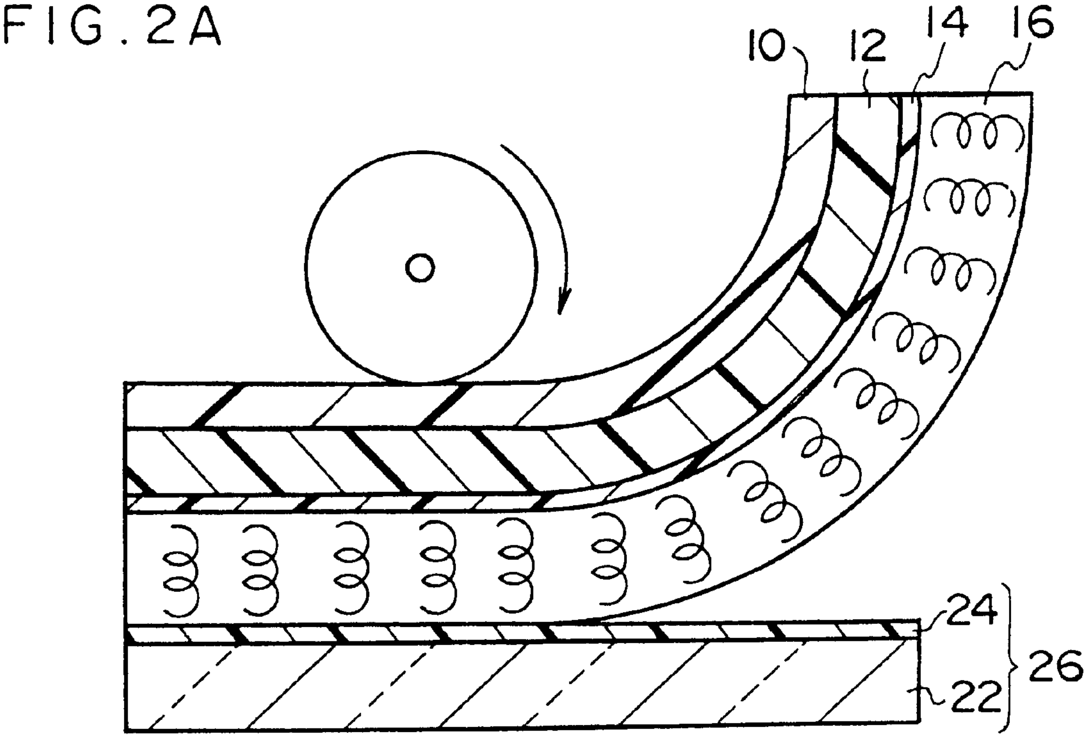
FIGS. 2A and 2B are schematic views that show one portion of processes in which the color filter of the present invention is manufactured.
Figure 2B:
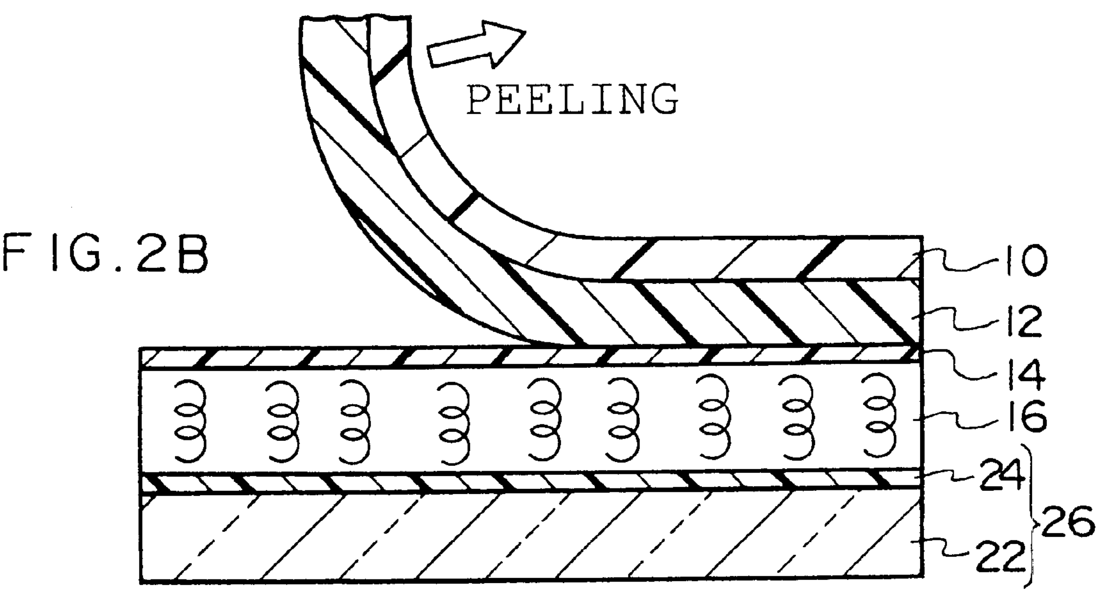

Next, as illustrated in FIG. 2A, after the cover film 18 has been peeled from the transfer sheet 20, these sheet and substrate are superposed so that the surface of the liquid crystal layer 16 of the transfer sheet 20 is in contact with the surface of the alignment film 24 of the color filter substrate 26, and laminated by a roll that rotates in the direction of the arrow in the figure. Thereafter, as illustrated in FIG. 2B, these layers are peeled from each other between the alignment film 14 and the cushion layer 12 so that the liquid crystal layer is transferred onto the color filter substrate together with the alignment film 14. In this case, it is not necessary to peel the cushion layer 12 together with the temporary support 10.

Figure 3A:
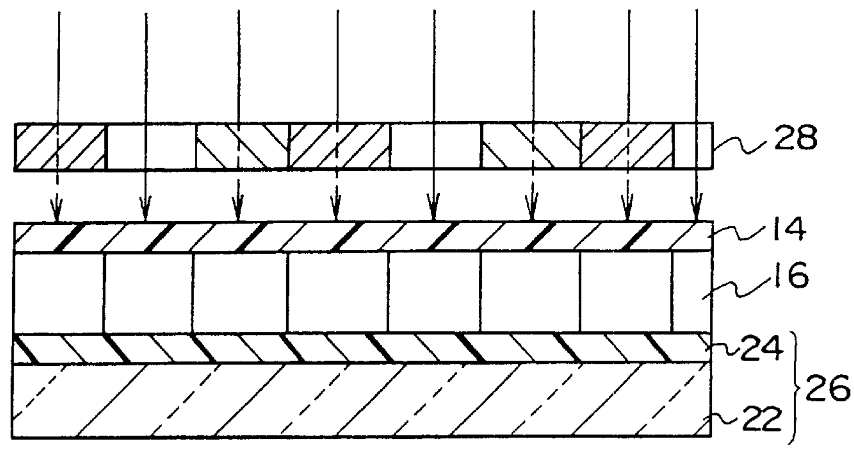
FIGS. 3A to 3C are schematic views that show one portion of processes in which the color filter of the present invention is manufactured.

After the transferring process, as illustrated in FIG. 3A, an exposing mask 28 having a plurality of areas having different light transmittances is placed above the alignment film 14, and light having a wavelength $\lambda_1$ is irradiated onto the liquid crystal layer 16 through the mask 28 in a patterned manner. The liquid crystal layer 16 contains a liquid crystal compound, a photoreactive chiral compound, etc., so as to cause the helical pitch to vary depending on the amount of light irradiation; thus, structures having different helical pitches are formed for respective patterns as areas that include, for example, an area for reflecting green color (G) with blue color (B) and red color (R) being transmitted, an area for reflecting blue color (B) with green color (G) and red color (R) being transmitted and an area for reflecting red color (R) with green color (G) and blue color (B) being transmitted.

Figure 3B:
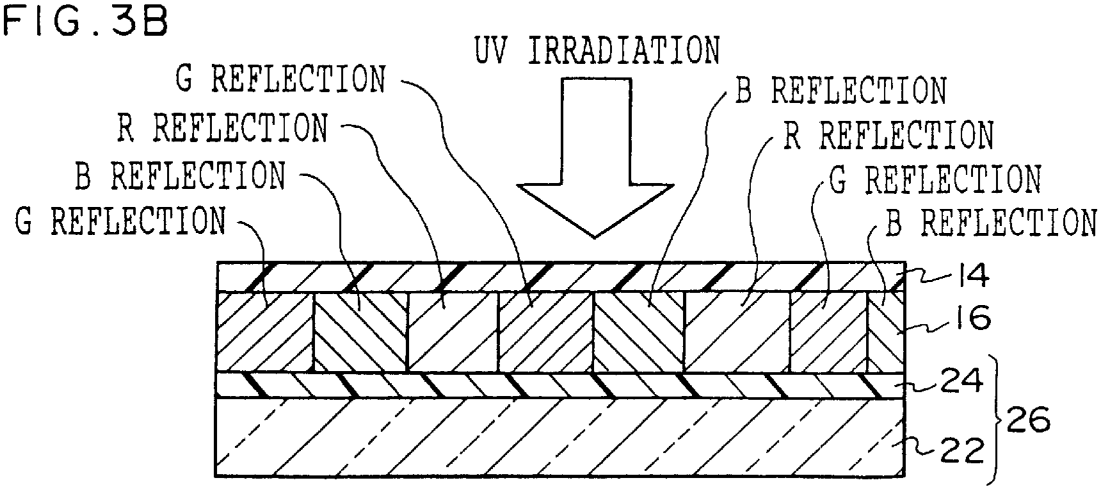

Next, as illustrated in FIG. 3B, light having a wavelength $\lambda_2$ ($\lambda_1 \neq \lambda_2$ or $\lambda_1 = \lambda_2$) is further irradiated onto the liquid crystal layer 16 so as to fix the patterns. Thereafter, the liquid crystal layer 16 is washed with a solvent such as cyclohexane so that unnecessary portions (for example, residual portions and unexposed portions of the cushion layer, intermediate layer, etc.) are removed from the liquid crystal layer 16; thus, as illustrated in FIG. 3C, a cholesteric liquid crystal layer having reflection areas of BGR is formed.

Figure 3C:
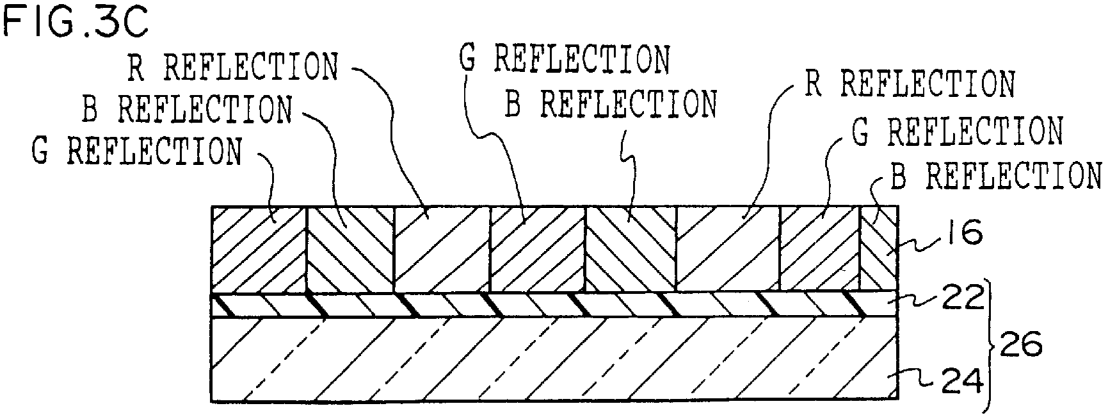

The method indicated by FIGS. 1A to 3C shows one aspect of the manufacturing method of a color filter using a laminate method; however, a manufacturing method using a coating method for directly forming the liquid crystal layer on the color filter substrate may be applied. In this case, the cholesteric liquid crystal layer is formed on the alignment film 24 of the color filter substrate 26 as shown in FIG. 1D, and dried thereon, and the processes shown in the FIGS. 3A to 3C are then successively carried out.

With respect to materials such as supports used in these processes, detailed descriptions thereof have been given in Japanese Patent Applications No. 11-342896 and No. 11-343665 that were filed by the inventors of the present invention.

[Optical Film]

The optical film of the present invention is formed as follows: active light rays are irradiated onto a layer containing the liquid crystal composition of the present invention so that at least one kind of compounds represented by the following formula (1) or formula (2) is polymerized and fixed. The liquid crystal composition has characteristics such that, upon irradiation with light, there is a large change in its helical pitch, and it also has a large birefringence $\Delta n$. Therefore, the optical film of the present invention using the liquid crystal composition makes it possible to achieve desired optical properties while maintaining a thin film thickness.

The optical film of the present invention is manufactured by a process (hereinafter, also referred to as "fixing process") in which active light rays are irradiated onto a layer containing the liquid crystal composition of the present invention so that at least one kind of compound represented by the following formula (1) or formula (2) is polymerized and fixed. Due to the light irradiation carried out in the fixing process, the photoreactive chiral compound in the layer undergoes structural changes, and this induces the liquid crystal compound to be oriented so as to have a predetermined helical pitch. The liquid crystal compound that has been oriented is polymerized and cured by light successively irradiated thereto, and fixed with this orientation.

In the fixing process, in the same manner as the above-mentioned manufacturing method of the color filter, the light irradiation may be carried out in two-stages. For example, first, light having the wavelength $\lambda_1$ that is close to the photosensitive wavelength area of the photoreactive chiral compound, in particular, close to the photosensitive peak wavelength thereof, is irradiated so that the liquid crystal compound is oriented. Next, light having the wavelength $\lambda_2$ that is close to the photosensitive wavelength area of the polymerization initiator, in particular, close to the light sensitive peak wavelength thereof is irradiated so that the polymerizing and curing processes are carried out. In the case where the light irradiation is carried out in the two-step manner, either of the cases $\lambda_1 \neq \lambda_2$ or $\lambda_1 = \lambda_2$ are possible. In the case of $\lambda_1 = \lambda_2$, the amount of irradiation is changed between the first step and the second step.

By adjusting the amount of light irradiation, it is possible to control the orientation of the liquid crystal composition, and consequently to manufacture an optical film having desired optical properties. For example, by combining this with an STN display element having symmetry in the twisting direction of the liquid crystal compound, it is possible to obtain functions as an optical compensating film. Moreover, it is also possible to use this as a reflective polarizing plate, etc.

The manufacturing method of the optical film of the present invention is not particularly limited as long as it includes at least the fixing process. Any other appropriate process may be used together with the fixing to provide the optical film. For example, beside these, in accordance with specific manufacturing aspects which may be selected, a process for forming a liquid crystal layer by placing the liquid crystal composition on a substrate, a process for carrying out an alignment process on the surface of contact of the liquid crystal composition, a process for transferring the liquid crystal composition (liquid crystal layer) through superposing and peeling operations, and other processes may be included. These other processes may be carried out in the same manner as the respective processes explained in the manufacturing method for the color filter.

With respect to the optical film of the present invention, its thickness is preferably in the range of not less than 1 μm to not more than 5 μm, and more preferably, in the range of not less than 1.5 μm to not more than 3 μm.

EXAMPLES

The following will discuss the present invention using Examples; however, the present invention is not intended to be limited by these examples.

Example 1

A polyimide coating solution for an alignment film (made by Hitachi Kasei du Pont Co., LX-1400) was coated onto a glass substrate by a spin coater, and this was dried in an oven at 100° C. for five minutes, and then baked in an oven at 250° C. for one hour to prepare an alignment film. Thereafter, the surface of the alignment film was subjected to a rubbing process to manufacture a glass substrate having an alignment film.

An coating solution containing the following liquid crystal composition was prepared.

| | |
|---|---|
| Liquid crystal compound<br>(compound (1) represented by the structure shown below) | 89 parts by mass |
| Photoreactive chiral compound<br>(compound (2) represented by the structure shown below) | 11 parts by mass |
| Polymerization initiator<br>(compound (3) represented by the structure shown below) | 3 parts by mass |
| Chloroform | 600 parts by mass |

Compound (1)

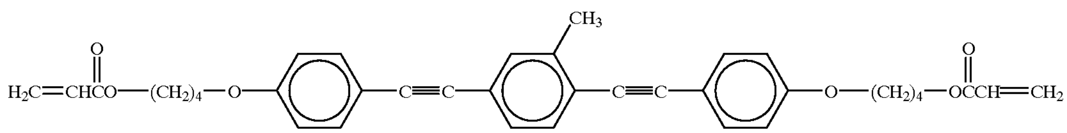

Compound (2)

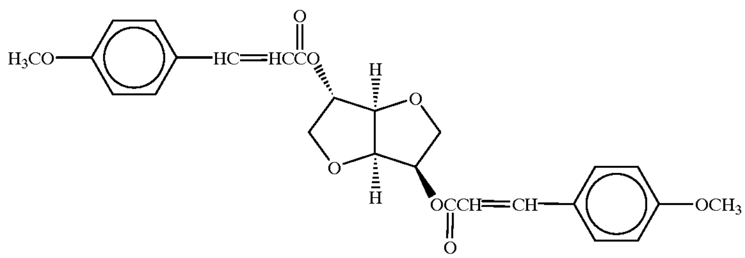

Compound (3)

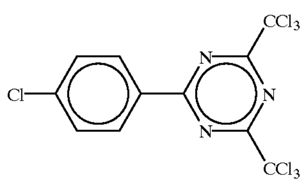

The coating solution thus prepared was coated onto the glass substrate (on the alignment film) by a spin coater, dried in an oven at 100° C. for two minutes to form a liquid crystal layer. Thereafter, the glass substrate was kept on a hot plate at 110° C. for three minutes to allow the liquid crystal layer to develop colors. An exposure was carried out through a photo-mask which had areas whose light transmittances were different from each other (light transmittances of 0%, 46% and 92%) and which were respectively arranged so as to correspond to a blue color pixel, a green color pixel and a red color pixel, and through a band pass filter whose center wavelength was 365 nm, using an ultra-high pressure mercury lamp. The irradiation energy was set to 100 mJ/cm$^2$ for the area for the red color pixel.

Next, the photomask and the band pass filter were removed, and while spraying nitrogen gas thereon, the entire surface was exposed (500 mJ/cm$^2$) using the same ultra-high pressure mercury lamp so that the liquid crystal compound was polymerized and cured. Moreover, in order to cure the filter portion, this was baked in an oven at 220° C. for 10 minutes to prepare a color filter in which the red color pixel, green color pixel and blue color pixel patterns were formed.

In the obtained color filter, the half-value width of the peak of the reflection spectrum of the green pixel was 110 nm, which was sufficient for use as a color filter.

Comparative Example 1

The same processes as Example 1 were carried out except that 93 parts by mass of a liquid crystal compound (4) having the following structure was used instead of 89 parts by mass of compound (1), and that 7 parts by mass instead of 11 parts by mass of compound (2) was used, so that a color filter was manufactured.

In the obtained color filter, the half-value width of the peak of the reflection spectrum of the green pixel was 50 nm, which was a narrow half-value width as compared with Example 1. Therefore, it is considered that the color filter of Example 1 will provide a lighter display than this color filter when used in a display element.

The TAC on which the liquid crystal film is formed was subjected to a UV irradiation by using a high-pressure mercury lamp at 100° C. so that the liquid crystal compound in the liquid crystal film was polymerized, and the film was cured to provide an optical film. The film thickness was 3.4 μm. Based on the polarized light transmission spectrum profile of the film thus formed, it was found that the orientation of the liquid crystal compound was twisted 240 degrees in the thickness direction of the film.

The obtained optical film was superposed on STN cells oriented with a twist opposite to that of the optical film and their molecule directions being set orthogonal to each other, and this was interpolated between two polarizing plates whose absorption axes were orthogonal to each other. When visually observed, it was confirmed that this film would provide a superior black display. Thus, it was found that the resulting optical film would function as an STN-use optical compensating film.

Compound (4)

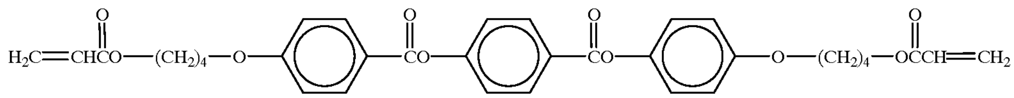

Example 2

An coating solution containing polyvinyl alcohol (PVA) having a saponification degree of 99.5% was coated onto a TAC (triacetyl cellulose) having a thickness of 80 μm by a bar coat method, and this was heated at 110° C. for three minutes to form a PVA film. This PVA film was subjected to a rubbing process, and this was coated with coating solution for a liquid crystal film, prepared based upon the following composition by a bar coater while being heated; then, this was dried in an oven at 120° C. for three minutes to form a liquid crystal film.

As described above, the present invention makes it possible to provide a liquid crystal composition whose optical property changes significantly upon irradiation with light, and also has a large Δn value. Moreover, the present invention also makes it possible to provide a reflection type color filter having a high reflectance and that provides a lighter display. Furthermore, the present invention also provides an optical film that is formed as a thin film.

| Composition of coating solution for a liquid crystal film | |
|---|---|
| Liquid crystal compound (compound (1) represented by the structure shown above) | 50 parts by mass |
| Liquid crystal compound (compound (5) represented by the structure shown below) | 50 parts by mass |
| photoreactive chiral compound (compound (6) represented by the structure shown below) | 0.7 parts by mass |
| Initiator (compound (3) represented by the structure shown above) | 3 parts by mass |
| Chloroform | 400 parts by mass |

Compound (5)

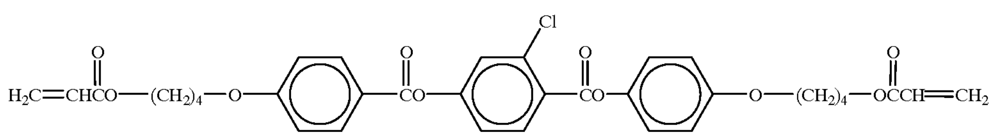

Compound (6)

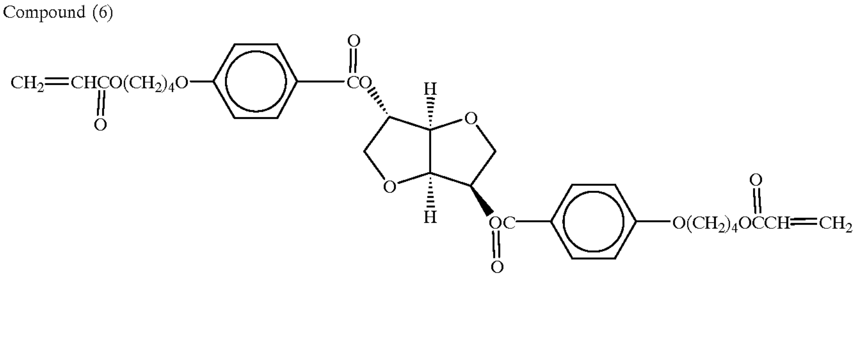

What is claimed is:

1. A liquid crystal composition comprising at least one of compounds represented by the following formula (1) or formula (2) and at least one of chiral compounds whose structure change upon photoreaction:

General formula (1)

$$R^1-(Ar^1)_{n1}-C\equiv C-(Ar^2)_{n2}-L^1-Ar^3-R^2$$

General formula (2)

$$R^3-(Ar^4)_{n3}-L^2-(Ar^5)_{n4}-C\equiv C-Ar^6-R^4$$

wherein, each of $R^1$, $R^2$, $R^3$ and $R^4$ represents at least one monovalent group selected from group 1 which consists of monovalent groups, each of $L^1$ and $L^2$ represents a single bond or at least one divalent group selected from group 2 which consists of divalent groups, each of $Ar^1$, $Ar^3$, $Ar^4$ and $Ar^6$ represents at least one divalent group selected from group 3 which consists of divalent groups, each of $Ar^2$ and $Ar^5$ represents at least one divalent group selected from group 4 which consists of divalent groups, and a carbon ring in groups 3 and 4 which consists of divalent groups may be substituted by at least one of a fluorine atom, a chlorine atom, a bromine atom, $—CF_3$, $—OCF_3$, $—OCHF_2$, $—CH_3$ and $—COCH_3$; each of n1, n2, n3 and n4 represents 0 or 1, and n represents any one of integers from 2 to 15 and groups 1,2,3, and 4 are as follows:

Group 1 of monovalent groups

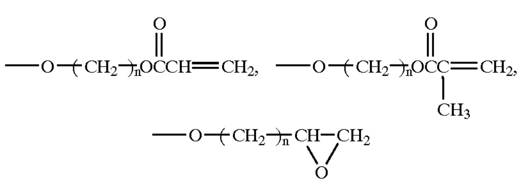

Group 2 of divalent groups

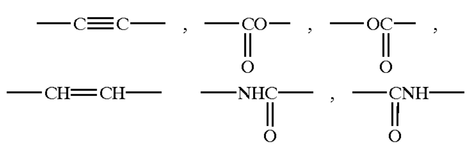

Group 3 of divalent groups

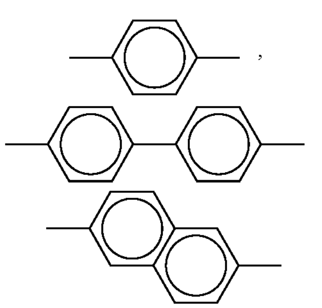

Group 4 of divalent groups

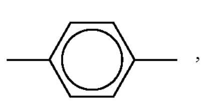

-continued

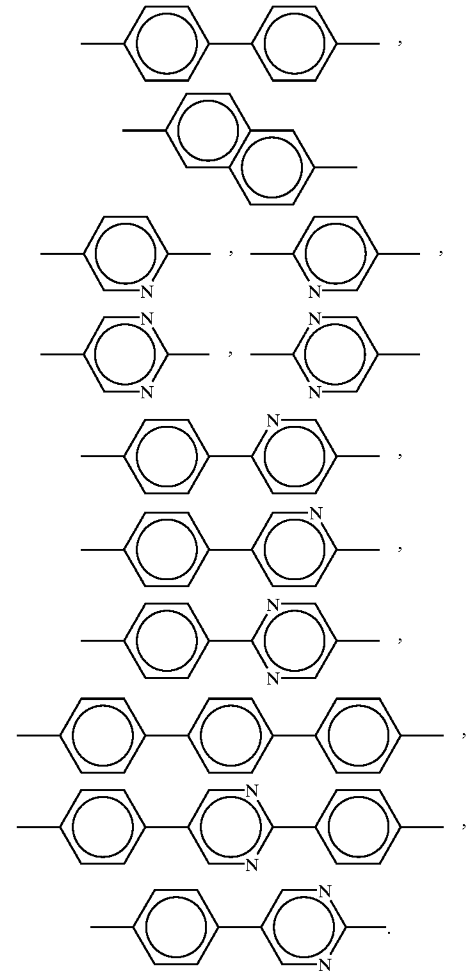

2. The liquid crystal composition according to claim 1, wherein the compound represented by said formula (1) or formula (2) has a content in a range from 10% to 98% by mass.

3. The liquid crystal composition according to claim 2, wherein the compound represented by said formula (1) or formula (2) has a content in the range from 20% to 80% by mass.

4. The liquid crystal composition according to claim 1, wherein the chiral compound has a content in a range from 2% to 30% by mass.

5. The liquid crystal composition according to claim 4, wherein the chiral compound has a content in the range from 3% to 15% by mass.

6. The liquid crystal composition according to claim 1, wherein the chiral compound is a polymerizable compound.

7. The liquid crystal composition according to claim 1, wherein the composition represented by said formula (1) or formula (2) has a birefringence $\Delta n$ in a range from 0.2 to 0.5.

8. The liquid crystal composition according to claim 1, wherein, in the compound represented by said formula (1) or formula (2), at least one monovalent group selected from said group 1 consisting of monovalent groups, represented by each of $R^1$, $R^2$, $R^3$ and $R^4$, is an acryloyloxy group.

9. The liquid crystal composition according to claim 1, wherein, in the compound represented by said formula (1) or formula (2), n represents any one of integers of 3 to 12.

10. The liquid crystal composition according to claim 9, wherein, in the compound represented by said formula (1) or formula (2), n represents any one of integers of 4 to 8.

11. The liquid crystal composition according to claim 1, wherein, in the compound represented by said formula (1) or formula (2), each of $L^1$ and $L^2$ represents a single bond or the following bond:

$$-C \equiv C-.$$

12. A color filter, comprising a layer having colored areas which are formed to have different selective reflections by irradiating active light rays having different irradiation amounts onto the layer having a liquid crystal composition that includes at least one of compounds represented by the following formula (1) or formula (2) and at least one of chiral compounds that undergo structural changes upon photoreaction:

General formula (1)

$$R^1-(Ar^1)_{n1}-C \equiv C-(Ar^2)_{n2}-L^1-Ar^3-R^2$$

General formula (2)

$$R^3-(Ar^4)_{n3}-L^2-(Ar^5)_{n4}-C \equiv C-Ar^6-R^4$$

wherein, each of $R^1$, $R^2$, $R^3$ and $R^4$ represents at least one monovalent group selected from group 1 which consists of monovalent groups, each of $L^1$ and $L^2$ represents a single bond or at least one divalent group selected from group 2 which consists of divalent groups, each of $Ar^1$, $Ar^3$, $Ar^4$ and $Ar^6$ represents at least one divalent group selected from group 3 which consists of divalent groups, each of $Ar^2$ and $Ar^5$ represents at least one divalent group selected from group 4 which consists of divalent groups, and a carbon ring in groups 3 and 4 which consist of divalent groups may be substituted by at least one of a fluorine atom, a chlorine atom, a bromine atom, $-CF_3$, $-OCF_3$, $-OCHF_2$, $-CH_3$ and $-COCH_3$; each of n1, n2, n3 and n4 represents 0 or 1, and n represents any one of integers of 2 to 15 and groups 1,2,3 and 4 are represented as follows:

Group 1 of monovalent groups

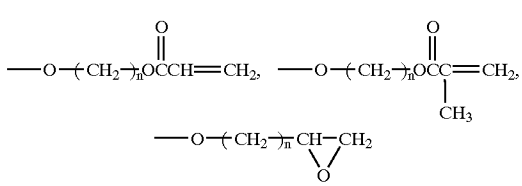

Group 2 of divalent groups

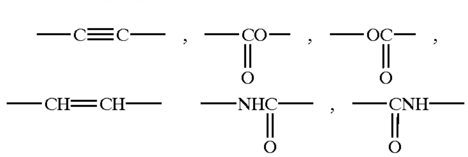

Group 3 of divalent groups

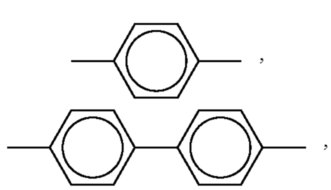

-continued

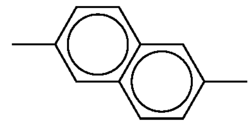

Group 4 of divalent groups

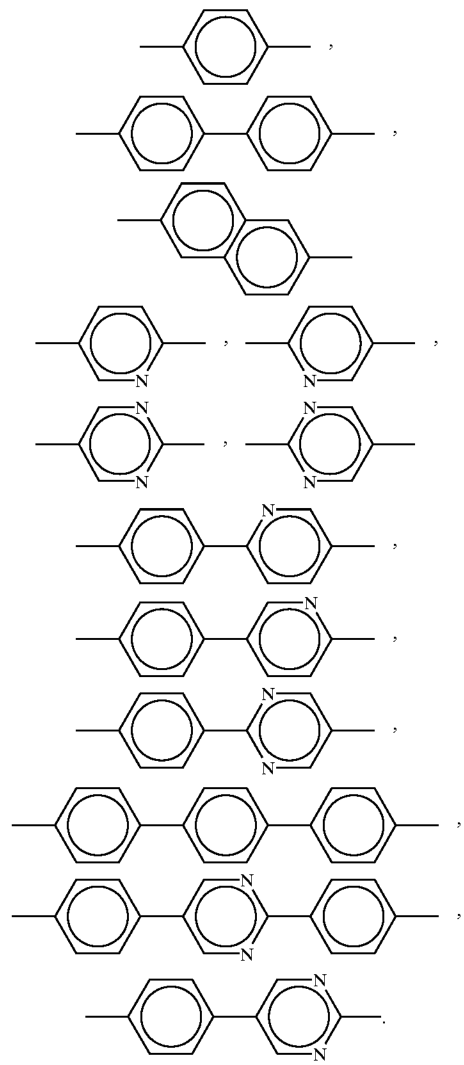

13. A color filter, comprising a layer having a red area, a green area and a blue area, the respective areas being formed by irradiating light rays onto a layer having a liquid crystal composition that includes at least one of compounds represented by the following formula (1) or formula (2) and at least one of chiral compounds that undergo structural changes upon photoreaction and showing colors due to circularly polarized reflections caused by helical pitches:

General formula (1)

$$R^1-(Ar^1)_{n1}-C \equiv C-(Ar^2)_{n2}-L^1-Ar^3-R^2$$

General formula (2)

$$R^3-(Ar^4)_{n3}-L^2-(Ar^5)_{n4}-C \equiv C-Ar^6-R^4$$

wherein, each of $R^1$, $R^2$, $R^3$ and $R^4$ represents at least one monovalent group selected from group 1 which consists of monovalent groups, each of $L^1$ and $L^2$ represents a single bond or at least one divalent group selected from group 2 which consists of divalent groups, each of $Ar^1$, $Ar^3$, $Ar^4$ and $Ar^6$ represents at least one divalent group selected from group 3 which consists of divalent groups, each of $Ar^2$ and $Ar^5$ represents at least one divalent group selected from group 4 which consists of divalent groups, and a carbon ring in groups 3 and 4 which consist of divalent groups may be substituted by at least one of a fluorine atom, a chlorine atom, a bromine atom, —$CF_3$, —$OCF_3$, —$OCHF_2$, —$CH_3$ and —$COCH_3$; and each of n1, n2, n3 and n4 represents 0 or 1, and n represents any one of integers of 2 to 15 and groups 1,2,3 and 4 are represented as follows:

Group 1 of monovalent groups

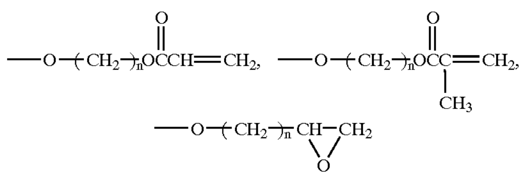

Group 2 of divalent groups

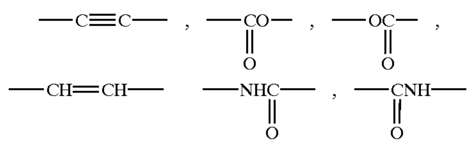

Group 3 of divalent groups

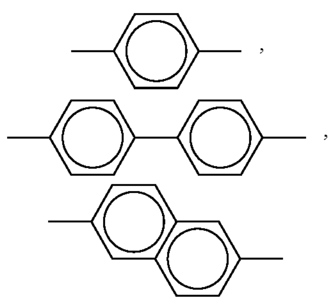

Group 4 of divalent groups

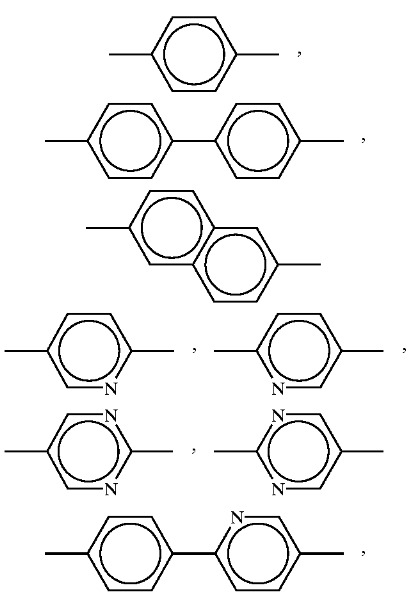

-continued

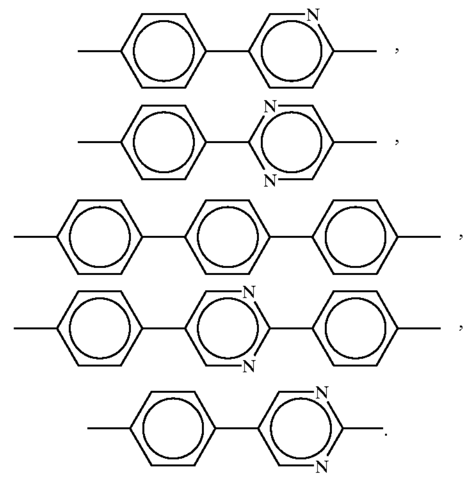

14. The color filter according to claim 13, wherein the green area has a half-value width of reflection spectrum in a range of 70 nm to 130 nm.

15. The color filter according to claim 14, wherein the green area has a half-value width of reflection spectrum in the range of 80 nm to 110 nm.

16. An optical film, which is formed by irradiating active light rays onto a layer containing a liquid crystal composition that includes at least one of compounds represented by the following formula (1) or formula (2) and at least one of chiral compounds that undergo structural changes upon photoreaction to cause a compound represented by the formula (1) or formula (2) to be polymerized and fixed:

General formula (1)

$$R^1—(Ar^1)_{n1}—C\equiv C—(Ar^2)_{n2}—L^1—Ar^3—R^2$$

General formula (2)

$$R^3—(Ar^4)_{n3}—L^2—(Ar^5)_{n4}—C\equiv C—Ar^6—R^4$$

wherein, each of $R^1$, $R^2$, $R^3$ and $R^4$ represents at least one monovalent group selected from group 1 which consists of monovalent groups, each of $L^1$ and $L^2$ represents a single bond or at least one divalent group selected from group 2 which consists of divalent groups, each of $Ar^1$, $Ar^3$, $Ar^4$ and $Ar^6$ represents at least one divalent group selected from group 3 which consists of divalent groups, each of $Ar^2$ and $Ar^5$ represents at least one divalent group selected from group 4 which consists of divalent groups, and a carbon ring in groups 3 and 4 which consist of divalent groups may be substituted by at least one of a fluorine atom, a chlorine atom, a bromine atom, —$CF_3$, —$OCF_3$, —$OCHF_2$, —$CH_3$ and —$COCH_3$; each of n1, n2, n3 and n4 represents 0 or 1, and n represents any one of integers of 2 to 15 and groups 1,2,3 and 4 are as represented as follows:

Group 1 of monovalent groups

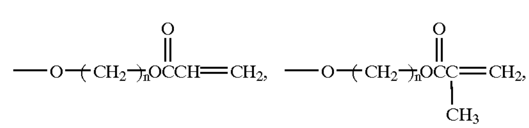

-continued
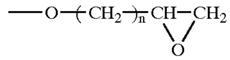
Group 2 of divalent groups
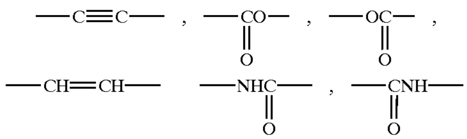
Group 3 of divalent groups
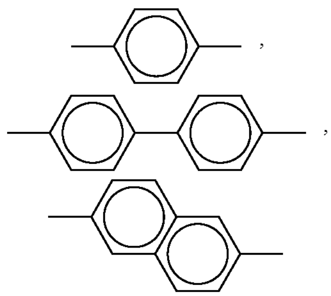
Group 4 of divalent groups
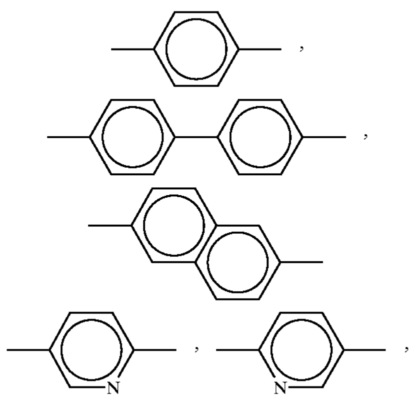
-continued
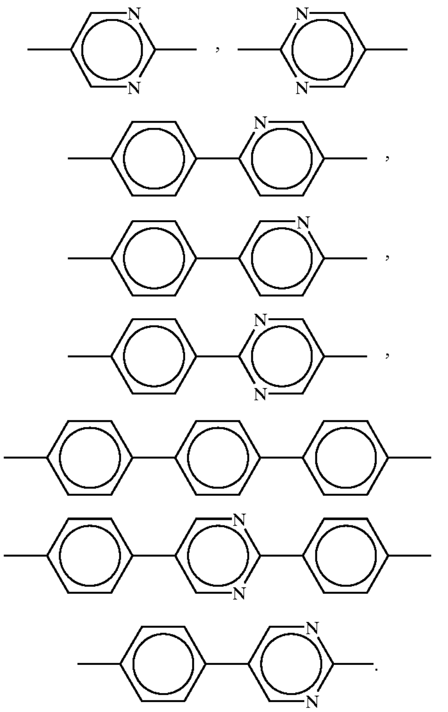
17. The optical film according to claim 16, which has a thickness in a range of 1 μm to 5 μm.
18. The optical film according to claim 17, which has a thickness in the range of 1.5 μm to 3 μm.
* * * * *